United States Patent [19]

Schmidhuber

[11] 3,902,625

[45] Sept. 2, 1975

[54] KNOCK-OUT FILLER FOR ELECTRICAL BOX

[76] Inventor: Anton Schmidhuber, 30141 Rosenbusch, Warren, Mich. 48093

[22] Filed: May 8, 1974

[21] Appl. No.: 468,020

[52] U.S. Cl. ............... 220/246; 220/243; 220/307
[51] Int. Cl.² ........................................ B65D 45/00
[58] Field of Search .......... 220/243, 246, 307, 308, 220/203; 174/53, 55, 56

[56] References Cited
UNITED STATES PATENTS

| | | | |
|---|---|---|---|
| 1,304,391 | 5/1919 | Sherry | 220/243 |
| 2,007,179 | 7/1935 | Bullis | 220/243 |
| 3,194,427 | 7/1965 | Mullett | 220/246 |
| 3,478,915 | 11/1969 | Smith | 220/243 |

Primary Examiner—William I. Price
Assistant Examiner—Ro E. Hart
Attorney, Agent, or Firm—Cullen, Settle, Sloman & Cantor

[57] ABSTRACT

A knock-out filler for an electrical box having a knock-out opening, has a disc overlapping the opening on one side of the wall and an axial stud projecting therethrough. A resilient spring clip of arcuate shape is secured centrally to said stud with its free ends retainingly engaging the opposite side of said wall. A pair of longitudinal slits in said clip define a pair of inwardly extending stays whose free ends retainingly engage said stud when the spring clip ends are manually flexed outwardly for holding the spring clip open under tension.

6 Claims, 6 Drawing Figures

PATENTED SEP 2 1975

3,902,625

KNOCK-OUT FILLER FOR ELECTRICAL BOX

BACKGROUND OF THE INVENTION

Heretofore, in the conventional use of electrical boxes in building walls, there are normally a series of circular scorings in the walls thereof defining knock-outs which may be selectively punched out for the entrance of cables and wires. Under most codes, it is required that any knock-out openings not used must be closed and in many cases sealed.

Heretofore, there have been disc-like devices which overlap the openings on opposite side with fastening means for securing the discs upon opposite side of the opening for closing same. Also, there has been a disc with spring fingers arranged in a circle for snapping frictionally into said knock-out opening. These, however, are difficult to assemble and disassemble.

BRIEF DESCRIPTION OF THE INVENTION

It is an object of the present invention to provide an improved knockout filler for electrical boxes which is inexpensive to make and easy to assemble.

It is another object to provide a disc and stud assembly which is mountable over the opening overlapping same on one side in conjunction with a manually flexible spring clip adapted to anchor the disc from the opposite side of the wall of the electrical box.

These and other objects will be seen from the following specification and claims in conjunction with the appended drawing.

THE DRAWING

It will be understood that the above drawing illustrates merely a preferred embodiment of the invention, and that other embodiments are contemplated within the scope of the claims hereafter set forth.

DETAILED DESCRIPTION OF THE INVENTION

Figure 1:
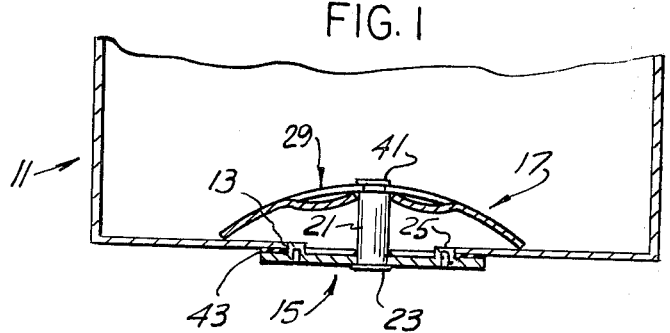
FIG. 1 is a fragmentary plan section of an electrical box with the present knock-out filler assembled thereon.

Referring to the drawing, the present knock-out filler assembly 15 for the electrical box 11 is shown assembled in FIG. 1. Said box has normally a series of scored circular openings from which knock-outs are punched out such as the illustrative knock-out 13.

In the use of electrical outlet boxes and as required, those knock-out openings which are not used must be closed and sealed in order to exclude moisture from the box or vermin and to prevent accidental access to electrical wires.

The present knock-out filler assembly is anchored in position by the stressed arcuate spring clip assembly 17.

Said filler assembly includes disc 19 which is adapted to bear against the wall of said box overlapping the opening 13 on one side thereof, as for example, the exterior, and includes the axial stud 21 riveted thereto at 23 and projecting through said opening. The stud could be otherwise secured to said disc, such as by welding.

Figure 5:
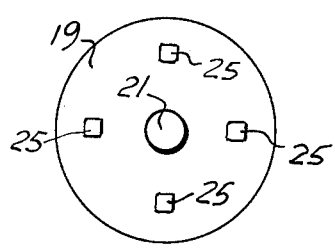
FIG. 5 is an end view of the disc and shaft taken from the inside of the box.
Figure 6:
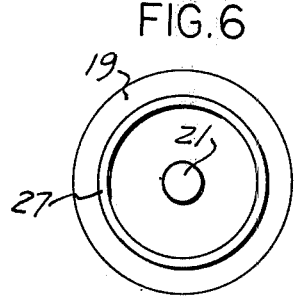
FIG. 6 is a similar view of a modified disc.

A series of spaced circularly arranged projections 25 extend from one side of the disc and are adapted to project through the opening 13 for centering the disc with respect thereto. Instead of the individual projections 25, FIG. 5, there may be merely an annular flange 27, FIG. 6.

Figure 4:
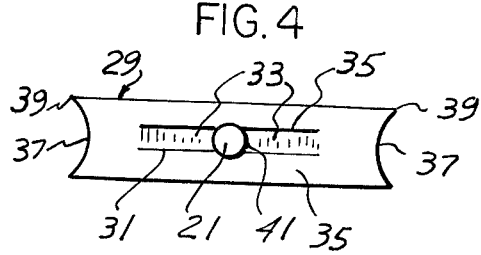
FIG. 4 is a plan view of the spring clip.

The spring clip assembly includes the elongated arcuate spring clip 29 shown in plan view in FIG. 4, which in normal use is arcuate, retainingly engaging the interior wall of the box.

Figure 3:
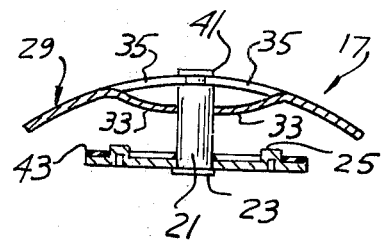
FIG. 3 is a similar view with the knock-out filler spring clip flexed and retained in open position.

Said spring clip has intermediate its ends a pair of parallel-spaced elongated slits 31, FIG. 4, defining a pair of opposed inwardly-directed stays 33 which are bent inwardly from said spring clip outwardly of the center thereof, defining a pair of slots 35, FIG. 3.

The opposite ends of the clip are recessed at 37 to define at their outer corner edges the grips 39.

The stud 21 projects through a central opening of the spring clip 29 and is suitably anchored thereto as by riveting at 41. Any other equivalent method of fastening may be employed such as welding.

The knock-out filler assembly 15-17 of FIG. 1 is mounted with respect to the wall of the knock-out box 11 with a suitable rubber or flexible gasget 43, sealingly interposed between the disc and the wall of the box, to complete the assembly.

OPERATION

Figure 2:
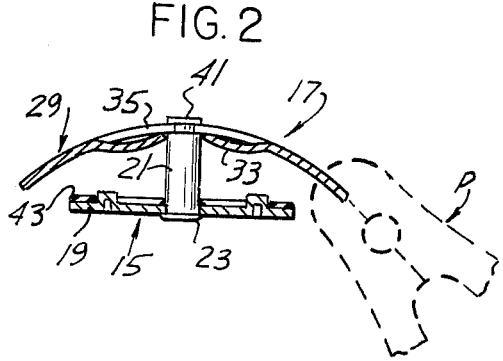
FIG. 2 is a corresponding view in section of the knock-out filler assembly.

In operation, before assembly of the knock-out filler, it may normally be in the unstressed condition, such as shown in FIG. 2. By applying a pliers, fragmentarily shown at P, FIG. 3, to the respective ends of the spring clip assembly 17, said ends are individually flexed outwardly, such as to the position shown in FIG. 3. During this flexing, the respective stays 33 move from the unstressed position shown in FIG. 2 to the operative position shown in FIG. 3 with the free ends of said stays operatively and retainingly engaging the stud 21 so as to hold the free ends of the spring clip flexed outwardly and stressed.

In this condition, the knock-out filler is assembled with respect to the box opening 13. As a final step, the pliers are used to compressively engage the stays with respect to the slotted portion of the spring clip. This permits the free ends of the spring clip to snap into operative retaining engagement with the inner wall of the box in the position shown in FIG. 1.

So positioned, the spring clip resiliently and retainingly engages said box in such fashion as to hold the complete assembly immovable as shown in FIG. 1. At the same time, the interior of the box is sealed from the exterior by the use of the rubber washer 43, retained in compression between said disc and the box.

It appears from FIG. 3 that with the spring clip 17 stressed to the release position, the free ends of the stays frictionally and retainingly and compressively engage said stud, with the spring clip under a substantial tension.

Accordingly, after assembly with respect to the box opening, when the stays are grasped compressively and moved towards the spring clip, the free ends thereof snap into the retaining position shown.

Having described my invention, reference should now be had to the following claims:

1. A knock-out filler for an electrical box having a wall with a knock-out opening comprising a disc bearing against said wall on one side overlapping said opening;

an axial stud projecting from said disc and through said opening;

an elongated arcuate resilient spring clip centrally mounted on and secured to the free end of said stud, with its ends retainingly engaging the opposite side of said wall;

said clip having a pair of parallel elongated slits intermediate its ends defining a pair of opposed flexible stays, whose free ends loosely engage said stud adjacent said clip;

the ends of said clip adapted to be manually flexed outwardly of said wall, with said stays flexing so that their free ends operatively and retainingly engage said stud holding the clip stressed in release position spaced from said disc.

2. In the knock-out filler of claim 1, a flexible sealing gasget of ring shape interposed between said wall and disc.

3. In the knock-out filler of claim 1, a series of centering projections on one side of the disc arranged in a circle and positioned within said opening.

4. In the knock-out filler of claim 1, the ends of said spring clip being recessed defining spaced corner grips at the ends of said clip.

5. In the knock-out filler of claim 1, an annular centering projection on one side of said disc positioned within said opening.

6. In the knock-out filler of claim 3, the ends of said spring clip being recessed defining spaced corner grips at the ends of said clip.

* * * * *